US011652844B2

(12) United States Patent
Nicușor-Sorin et al.

(10) Patent No.: US 11,652,844 B2
(45) Date of Patent: May 16, 2023

(54) UTILIZING CLUSTERING TO IDENTIFY IP ADDRESSES USED BY A BOTNET

(71) Applicant: ADOBE INC., San Jose, CA (US)

(72) Inventors: Portase Nicușor-Sorin, Bucharest (RO); Cristian-Aurel Opincaru, Bucharest (RO); Manole Catalin-Teodor, Bucharest (RO)

(73) Assignee: ADOBE INC., San Jose, CA (US)

( * ) Notice: Subject to any disclaimer, the term of this patent is extended or adjusted under 35 U.S.C. 154(b) by 306 days.

(21) Appl. No.: 16/864,350

(22) Filed: May 1, 2020

(65) Prior Publication Data
US 2021/0344708 A1 Nov. 4, 2021

(51) Int. Cl.
*H04L 9/40* (2022.01)
(52) U.S. Cl.
CPC ...... *H04L 63/1466* (2013.01); *H04L 63/0236* (2013.01); *H04L 63/0876* (2013.01); *H04L 63/1416* (2013.01); *H04L 63/1425* (2013.01); *H04L 63/1433* (2013.01)
(58) Field of Classification Search
CPC .......... H04L 2463/144; H04L 63/0236; H04L 63/0876; H04L 63/1416; H04L 63/1425; H04L 63/1433; H04L 63/1441; H04L 63/1466
See application file for complete search history.

(56) References Cited

U.S. PATENT DOCUMENTS

| | | | | |
|---|---|---|---|---|
| 2008/0109870 | A1* | 5/2008 | Sherlock | H04L 63/1425 726/1 |
| 2008/0276319 | A1* | 11/2008 | Rittermann | H04L 63/1425 726/23 |
| 2010/0064353 | A1* | 3/2010 | Kan | H04L 63/1408 726/5 |
| 2010/0186066 | A1* | 7/2010 | Pollard | H04L 9/3271 726/28 |
| 2012/0084860 | A1* | 4/2012 | Cao | H04L 63/1441 726/23 |
| 2012/0167210 | A1* | 6/2012 | Oro Garcia | H04L 63/101 726/22 |
| 2015/0215325 | A1* | 7/2015 | Ogawa | G06F 16/13 726/23 |
| 2015/0295875 | A1* | 10/2015 | El Daher | H04L 51/20 709/206 |

(Continued)

Primary Examiner — Daniel B Potratz
Assistant Examiner — Matthias Habtegeorgis
(74) Attorney, Agent, or Firm — Shook, Hardy & Bacon L.L.P.

(57) ABSTRACT

Methods and systems are provided for identifying suspect Internet Protocol (IP) addresses, in accordance with embodiments described herein. In particular, embodiments described herein include obtaining a set of login pairs comprising login identifiers (e.g., user identifiers) and IP addresses used in attempts to login to a source. A set of IP clusters is generated using the set of login pairs. Each IP cluster can include one or more IP addresses identified as related based on a login identifier being used to attempt to login to the source via multiple IP addresses or an IP address being used to attempt to login to the source via multiple login identifiers. Thereafter, it is determined that a particular IP cluster exceeds a threshold amount of IP addresses. Each of the IP addresses within the particular IP cluster is designated as a suspect IP address.

20 Claims, 7 Drawing Sheets (56) References Cited

U.S. PATENT DOCUMENTS

| | | | |
|---|---|---|---|
| 2018/0077174 A1* | 3/2018 | Hebert | H04L 63/1425 |
| 2018/0097828 A1* | 4/2018 | Coskun | H04W 12/08 |
| 2018/0097840 A1* | 4/2018 | Murthy | H04L 63/02 |
| 2020/0074439 A1* | 3/2020 | Hayman | H04L 69/28 |
| 2020/0112562 A1* | 4/2020 | Hearty | G06F 17/18 |

* cited by examiner

UTILIZING CLUSTERING TO IDENTIFY IP ADDRESSES USED BY A BOTNET

BACKGROUND

Cyber attackers may attempt to gain unauthorized access to a user account via credential stuffing attacks. In particular, leaked login credentials (e.g., from a data breach) may be obtained by an attacker and used in an effort to gain unauthorized access to accounts via large-scale automated login requests. Such credential stuffing attacks can enable unauthorized access to accounts, resulting in risks to both the user with the leaked login credentials and the entity owning the source of the user account. As such, identifying and blocking these credential stuffing attacks is important to protect both account holders and source owners.

SUMMARY

Accordingly, embodiments of the present disclosure are directed to identifying IP addresses used by a botnet via clusters. In particular, in cases that an attacker utilizes verified and unverified login credentials in an attempt to perform a credential stuffing attack, botnets, or IP addresses used via botnets, can be detected. In accordance with detecting a botnet, or associated suspected IP addresses, login security can be enhanced. For example, a subsequent login attempt via an IP address associated with a detected botnet can result in multi-factor authentication or challenge-response authentication (e.g., CAPTCHA) to complete the login process.

In operation, embodiments described herein facilitate detection of botnet IP addresses, or IP addresses used by botnets. In particular, a clustering approach is used to detect suspect IP addresses operating in association with a botnet. As described, login pairs, including user identifiers and IP addresses, associated with login attempts are analyzed to generate a user map that maps user identifiers to IP addresses and an IP map that maps IP addresses to users. The two maps can be traversed to identify clusters of IP addresses. In cases that an IP cluster exceeds a threshold amount of IP addresses, the IP addresses can be designated as used via a botnet. Accordingly, such IP addresses can be added to an IP blacklist for use in enforcing secure logins when a subsequent attempt is made to login to a source via a blacklisted IP address.

DETAILED DESCRIPTION

As computer users may reuse the same login credentials, such as username and password, across multiple sources (e.g., websites, applications, devices, etc.), cyber attackers may use this information in an effort to gain unauthorized access to or make unauthorized use of an asset (e.g., data, device). In particular, credential stuffing attacks may be employed to utilize stolen or leaked login credentials (e.g., from a data breach) to gain unauthorized access to user accounts through large-scale automated login requests, for example, directed to a web application. Instead of attempting a brute force or a guess of login credentials, an attacker automates logins to a source or across a set of sources for numerous previously identified (leaked) login credentials using standard web automation tools. Such credential stuffing attacks can enable unauthorized access to accounts, resulting in risks to both the user with the leaked login credentials and the entity owning the source of the user account. As such, identifying and blocking these credential stuffing attacks is important to protect both account holders and source owners.

As numerous previously leaked login credentials, oftentimes thousands to millions, can be used to facilitate credential stuffing attacks, such attacks generally use multiple servers to verify or validate login credentials. Accordingly, some conventional systems have been developed to identify an increase of login traffic originating at a particular server's Internet Protocol (IP) address. The IP address corresponding with a server originating an increase or threshold level of login traffic can then be added to an IP blacklist to prevent furtherance of the attack.

As such, in some cases, botnets are used to assist with distribution of the attack over numerous (e.g., tens of thousands) distinct IP addresses. Generally, a botnet includes a number of devices connected over a network (Internet), with each device running one or more bots that run automated tasks (scripts) over the network. Because botnets facilitate distribution of the attack across numerous IP addresses, identifying an increase or threshold level of login traffic from a particular server becomes more difficult. For example, when the attack load is evenly distributed among botnet nodes or devices, changes to login traffic of individual IP addresses are difficult to detect.

Credential stuffing attacks generally have a low success rate (around 0.01%). Due to the low success rate, other conventional implementations have been developed to detect and block malicious activity using per-IP counters of successful and failed login attempts. IP addresses associated with low success-to-failure ratios, as identified via the counters, can be identified and added to an IP blacklist used to prevent unauthorized use of login credentials.

As such, to increase the number of successful login attempts, in some cases, attackers utilize verified login credentials in combination with the leaked login credentials. For example, attacker-generated login credentials or previously-verified login credentials may be used along with leaked, or unverified, login credentials, to increase the success-to-failure ratio for botnet IP addresses. Utilizing verified login credentials with the leaked login credentials increases the difficulty of identifying malicious attacks via IP counter-based detection.

Accordingly, embodiments discussed herein are directed to using clusters to identify IP addresses associated with a botnet. As such, in cases that an attacker utilizes verified and unverified login credentials in an attempt to perform a credential stuffing attack, botnets, or IP addresses used via botnets, can be detected. In accordance with detecting a botnet, or associated suspect IP addresses, login security can be enhanced. For example, a subsequent login attempt via an IP address associated with a detected botnet can result in multi-factor authentication or challenge-response authentication to complete the login process.

Embodiments described herein facilitate detection of botnet IP addresses, or IP addresses used by botnets. In particular, a clustering approach is used to detect suspect IP addresses operating in association with a botnet. As described, an attacker may utilize verified and unverified login credentials to perform credential stuffing attacks. In this regard, the use of both verified and unverified login credentials by attackers is intended to overcome the security implemented to detect suspect IP addresses via low success-to failure ratio of login attempts identified by IP counters. The utilization of a common set of verified login credentials by hackers, however, can be used to detect suspect IP addresses, or IP addresses associated with a botnet. Stated differently, the sharing of the same verified credentials being used across devices of a botnet to attempt logins can indicate suspect IP addresses, as described herein. This sharing of verified credentials ensures that IP addresses associated with a botnet will belong to a same IP address cluster, as described more fully herein.

In operation, login data, including user identifiers and IP addresses, associated with login attempts are analyzed to identify clusters of IP addresses. In embodiments, the login data are analyzed to generate a user map that maps user identifiers to IP addresses and an IP map that maps IP addresses to users. The two maps can be traversed to identify clusters of IP addresses. Generally, to include an IP address in a cluster, the IP address shares a user in common with use of another IP address. That is, two IP addresses belong to a same cluster if there is a user that used both IP addresses in an attempt to login to a source. Further, two IP addresses belong to a same cluster by transitivity, that is, when there is a chain of (user, IP) pairs with the property that there is at least one user shared by each two IP addresses. In this regard, the IP clusters may be aggregated when an IP address overlaps with two IP clusters. In cases that an IP cluster size exceeds a threshold amount of IP addresses, the IP addresses can be designated as used via a botnet, or suspected botnet. Accordingly, such IP addresses can be added to an IP blacklist for use in enforcing a secure login when a subsequent attempt is made to login to a source via a blacklisted IP address.

Advantageously, IP addresses associated with a suspected botnet can be identified and utilized to defend against credential stuffing attacks. In particular, multi-factor authentication, CAPTCHA, or other security measure may be used to manage secure logins when an IP address identified in the IP blacklist is used in an effort to login to a source. Although multi-factor authentication and/or CAPTCHA could be used for every login to maintain secure logins and mitigate credential stuffing attacks, such measures can decrease user experience as it results in an additional step required by a user for login. As such, embodiments described herein increase user satisfaction by only imposing additional login security (e.g., multi-factor authentication or CAPTCHA) when deemed necessary (e.g., detecting use of a suspect IP address).

Further, embodiments described herein are computationally efficient as one-half million login attempts can be analyzed in less than a second. Advantageously, in cases that other credential stuffing attacks are occurring at the same time and utilize overlapping or shared leaked credentials, the IP addresses associated with a botnet of this addition credential stuffing attack(s) can also be aggregated to the same IP address cluster. As such, these IP addresses can also be identified as suspect irrespective of the specific technical approach being used by the additional credential stuffing attack.

Figure 1:
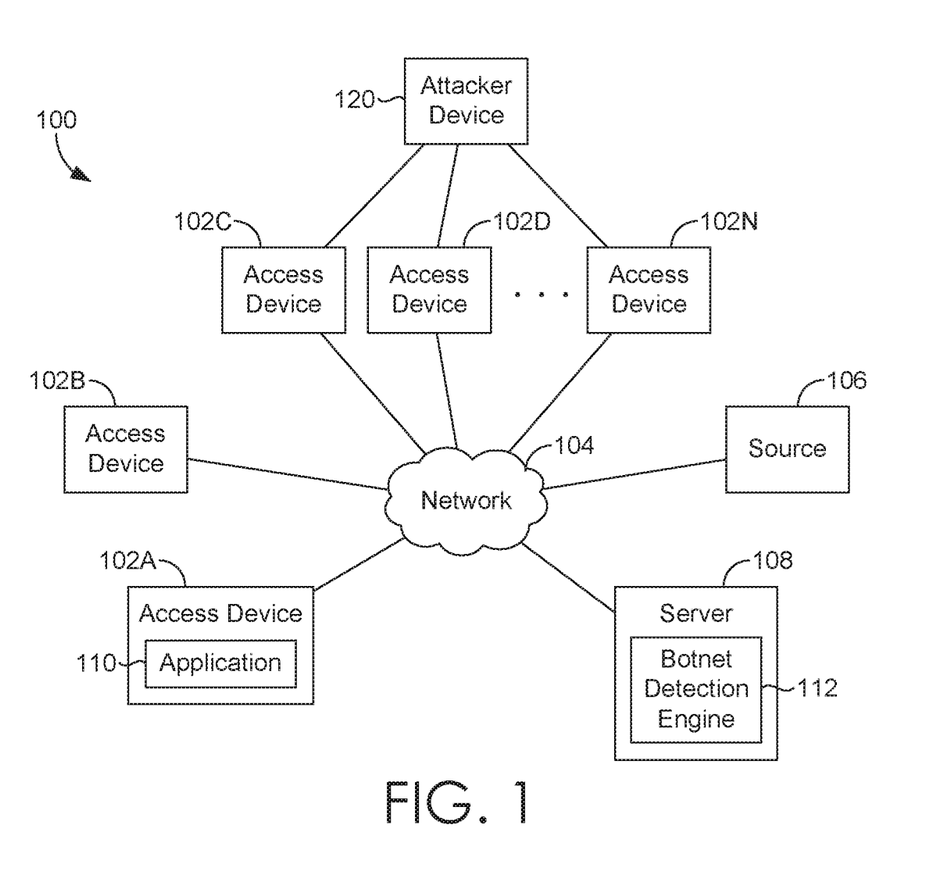
FIG. 1 depicts a diagram of an environment in which one or more embodiments of the present disclosure can be practiced, in accordance with various embodiments of the present disclosure.

Although embodiments are generally described herein as detecting a botnet or IP addresses associated therewith, it can be appreciated that embodiments described herein are not limited to botnet implementations. As an example, embodiments described herein can be used to detect large groups of IP addresses controlled by a single person or entity. Botnet are one example and is used throughout for simplicity, but the method can also apply in other environments including open-proxies and purchased servers, Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of devices, such as access device 102, attacker device 120, source device 106, and server device 108. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of access devices, servers, and other components may be employed within operating environment 100 within the scope of the present disclosure. Each may comprise a single device or multiple devices cooperating in a distributed environment.

Access devices 102a through 102n can be any type of computing device capable of being operated in an effort to access a source 106 via a network 104. For example, in some implementations, access devices 102a through 102n are the type of computing device described in relation to FIG. 7. By way of example and not limitation, an access device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The access devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other access devices can include one or more applications similar to application 110.

The application(s) may generally be any application capable of facilitating the exchange of information between the access devices and the source(s) 106 and/or server(s) 108, for example, in carrying out identifying IP addresses used by a botnet or providing botnet IP address identification. Generally, an access device refers to a client device being used to access a source (e.g., via login credentials). In some implementations, the application(s) comprises a web application, which can run in a web browser, and could be hosted at least partially on the server-side of environment 100. In addition, or instead, the application(s) can comprise a dedicated application, such as an application having a login to access the source (e.g., application). In some cases, the application is integrated into the operating system (e.g., as a service). It is therefore contemplated herein that "application" be interpreted broadly.

In accordance with embodiments herein, the application 110 can facilitate login attempts to source 106. For example, a set of user credentials (e.g., username and password) may be used via the application 110 in an effort to login to the source 106. The source 106 may be any source that provides content via the application 110. For example, a source may be a server hosting a website, a server hosting an application (e.g., mobile or web application), or the like. Although illustrated as a single component, source 106 can be any number of servers, or cluster of servers.

The server 108 may be associated with source 106. For example, an entity that controls, owns, or manages the source (e.g., website) 106 may also control, own, or manage server 108. Although illustrated as a single component, server 108 may include any number of components, servers, cluster of servers, etc. to perform functionality described herein. Server 108 includes one or more processors, and one or more computer-readable media. The computer-readable media includes computer-readable instructions executable by the one or more processors. The instructions may optionally implement one or more components of botnet detection engine 112, described in additional detail below with respect to botnet detection engine 202 of FIG. 2. At a high level, botnet detection engine 112 is generally configured to facilitate identification of IP addresses associated with a botnet.

For cloud-based implementations, the instructions on server 108 may implement one or more components of botnet detection engine 112, and application 110 may be utilized by a user to interface with the functionality implemented on server(s) 108. In some cases, application 110 comprises a web browser. In other cases, server 108 may not be required. In some cases, botnet detection engine 112 may be embodied at least partially by the instructions corresponding to application 110.

Thus, it should be appreciated that botnet detection engine 112 may be provided via multiple devices arranged in a distributed environment that collectively provide the functionality described herein. Additionally, other components not shown may also be included within the distributed environment. In addition, or instead, botnet detection engine 112 can be integrated, at least partially, into an access device or a source 106. Furthermore, botnet detection engine 112 may at least partially be embodied as a cloud computing service.

In operation, as access devices 102 attempt logins to source 106, login data (e.g., usernames and IP addresses) can be collected and obtained by botnet detection engine 112. Botnet detection engine 112 can then utilize such login data to detect botnets, or IP addresses suspected to be used by botnets. Any suspect IP addresses can be added to an IP blacklist, which may be maintained by botnet detection engine 112. As such, when an access device subsequently attempts to access, or login to, source 106, the IP blacklist can be referenced to determine whether the IP address is in the IP blacklist. If so, an increased security measure can be taken to complete login to the source (e.g., two-factor authentication or CAPTCHA).

As shown, access devices 102C-102N can be controlled by an attacker device 120. An attacker device 120 may initiate logins via access devices 102C-102N using leaked or compromised login credentials. As described, the leaked or compromised login credentials may be used and spread across numerous access devices associated with various IP addresses. In some cases, to prevent detection of an attack, both leaked, or unverified, login credentials may be used along with verified login credentials across the access devices 102C-102N.

Figure 2:
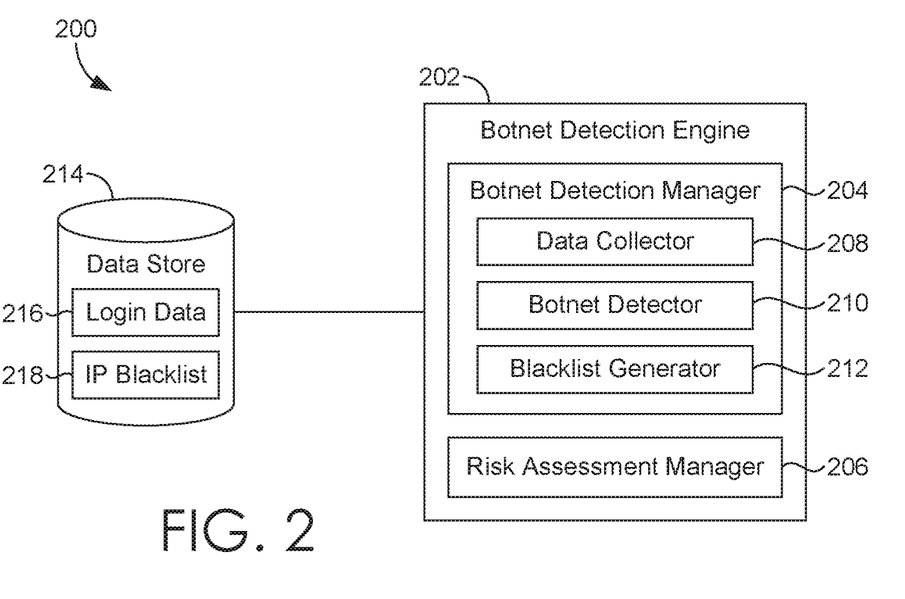
FIG. 2 depicts an example configuration of an operating environment in which some implementations of the present disclosure can be employed, in accordance with various embodiments of the present disclosure.

Referring to FIG. 2, aspects of an illustrative botnet detection system 200 (or botnet IP address detection system) are shown, in accordance with various embodiments of the present disclosure. Generally, botnet detection system 200 is configured to facilitate identifying IP addresses used by a botnet. Botnet detection engine 202 includes a botnet detection manager 204 and a risk assessment manager 206. As shown, the botnet detection manager 204 includes a data collector 208, a botnet detector 210, and a blacklist generator 212. The foregoing components of botnet detection engine 202 can be implemented, for example, in operating environment 100 of FIG. 1. In particular, those components may be integrated into any suitable combination of access device(s) 102, source(s) 106, and/or server(s) 108.

Data store 214 can store computer instructions (e.g., software program instructions, routines, or services), data, and/or algorithms used in embodiments described herein. In some implementations, data store 214 stores information or data received or generated via the various components of botnet detection engine 202 and provides the various components with access to that information or data, as needed. Although depicted as a single component, data store 214 may be embodied as one or more data stores. Further, the information in data store 214 may be distributed in any suitable manner across one or more data stores for storage (which may be hosted externally).

In embodiments, data stored in data store 214 includes log data 216 and an IP blacklist 218. Login data generally refers to data associated with logins (e.g., user logins). In embodiments, login data may include any data associated with logins to a particular source, such as a web application. In this regard, login data may include a login identifier (user identifier and/or other login credential, such as password) and an IP address. A user identifier generally refers to any identifier of a user, such as a user name. Although a user identifier is generally discussed herein, as can be appreciated, other login information or identifiers may be used in accordance with embodiments described herein. For example, a login identifier may include HTTP user-agent string, a specific HTTP header, or any other information disclosed during the login process. An IP address is a unique string of characters that identifies a computer using the Internet Protocol to communicate over a network. An originating IP refers to an IP address from which an attempt is being made to access a source (e.g., web application). In some cases, login identifiers (e.g., user identifiers) and originating IP addresses are stored as login pairs in the data store 214. In other cases, login data may be stored in raw form, as log data, in data store 214. As can be appreciated, the login data can include log data, or login pairs, for any attempt to login, irrespective of whether the attempt is successful.

In some cases, data store 214 can obtain login data 216 from access devices, such as access device 102 of FIG. 1, and provide, or otherwise enable access of, login data to botnet detection engine 112 of FIG. 1 or 202 of FIG. 2. Such login data may be generated in association with logins from legitimate users and/or attackers. As such, the login data may be generated in association with attacker logins. In this regard, devices in a botnet may be used for logins resulting in login data being generated and stored in login data 216. As such, data store 214 can obtain login data 216 from access devices, such as access device 102 of FIG. 1, including access devices utilized by an attacker. In other cases, data can be received from one or more data stores in the cloud.

IP blacklist 218, or IP address blacklist, can include a set of IP addresses designated as suspicious. As described herein, the set of IP addresses in the IP blacklist 218 can be identified via a botnet detection engine 202. As can be appreciated, an IP blacklist 218 may also include suspect IP addresses identified as suspicious via other detection systems. For example, IP addresses to blacklist identified using IP counters may also be included in the IP blacklist 218 such that the IP blacklist 218 includes all IP addresses to blacklist, irrespective of the algorithm used to identify suspect IP addresses.

As can be appreciated, the data store 214 may be remote from the botnet detection engine 202. Further, although illustrated as one data store with login data and an IP blacklist, as can be appreciated, the data may be stored in separate data stores.

The botnet detection manager 204 is generally configured to detect IP addresses associated with botnets, or stated differently, to detect suspect IP addresses. In particular, botnet detection manager 204 is used to identify suspect IP addresses used by a botnet. At a high level, and as described in more detail below, the botnet detection manager 204 generally uses clustering to identify suspect IP addresses, or IP addresses corresponding with a botnet.

The data collector 208 is generally configured to collect, obtain, receive, retrieve, or otherwise access login data. In particular, the data collector 208 can obtain login identifier and IP address pairs originating from login attempts. As previously described, each time a login occurs (e.g., via a legit user or an attacker) in association with a particular source (e.g., web application), data logs are generated including a login identifier (e.g., user identifier) and an IP address that originated the login attempt. Accordingly, the data collector 208 is used to obtain data indicating that particular entities, as identified by a login identifier (e.g., user name), have attempted to login from particular IP addresses.

Such login data, or login pairs, can be accessed via the data store 214. In some cases, login pairs, including login identifier and IP address, may be obtained directly from data store 214 as the login pairs may already be extracted from log data and stored in pair values as login data 216. In other cases, the data collector 208 may obtain lines of log data via data store 214 and, thereafter, extract logins pairs. In addition to or alternatively to obtaining login data via the data store 214, in some cases, the login data (e.g., login pairs) may be obtained or accessed via an API used to retrieve the login data from a remote data store.

In some cases, login data is obtained via the data collector 208 on a periodic basis. In this regard, the data collector 208 may operate to obtain login data after a lapse of a time duration, such as, for instance, 15 minutes. In other cases, login data may be obtained in a continuous manner or based on occurrence of an event or reception of an instruction (e.g., source-specified instruction). Further, the data collector 208 may be configured to obtain login data associated with or occurring over any period of time. For example, the data collector 208 may obtain data from the last two hours of login activity. As can be appreciated, the data collector 208 generally obtains login data associated with all login attempts during a time period, irrespective of whether such login attempts are successful.

The botnet detector 210 is generally configured to facilitate detection of botnet IP addresses, or IP addresses used by botnets. In particular, botnet detector 210 utilizes a clustering approach to detect suspect IP addresses operating in association with a botnet. As previously described, an attacker may utilize verified and unverified login credentials to perform credential stuffing attacks. In this regard, the use of both verified and unverified login credentials by attackers is intended to overcome the security implemented to detect suspect IP addresses via IP counters to count successful and failed login attempts. The utilization of a common set of verified login credentials by hackers, however, can be used to detect suspect IP addresses, or IP addresses associated with a botnet. Stated differently, the sharing of the same verified credentials being used across devices of a botnet to attempt logins can indicate suspect IP addresses. This sharing of verified credentials ensures that IP addresses associated with a botnet will belong to a same IP address cluster, as described more fully herein. Advantageously, in cases that other credential stuffing attacks are occurring at the same time and utilize the same set of leaked credentials, the IP addresses associated with a botnet of this addition credential stuffing attack(s) can also be aggregated to the same IP address cluster, thereby identifying such IP addresses as suspect irrespective of the specific technical approach being used by the additional credential stuffing attack.

In operation, the botnet detector 210 can generate a login-to-IP mapping (generally referred to herein as a login mapping or user mapping) and an IP-to-login mapping (generally referred to herein as an IP mapping). An IP mapping generally maps or associates each IP address to a set of login identifiers (e.g., users) that attempted a login(s) in using the corresponding IP address. For example, an IP mapping may include a first IP address mapped to User 1, User 2, and User 3 and a second IP address mapped to User 3, User 4, and User 5. A login mapping generally maps or associates each login identifier (e.g., user) to a set of IP addresses used to attempt a login. For example, a login mapping may include a User 1 mapped to a first IP address and a User 2 mapped to a first IP address, a second IP address, and a third IP address.

To generate the mappings, the botnet detector 210 can utilize the login pairs obtained via data collector 208. In this regard, the botnet detector 210 can use as input a set of (user_n, IP_n) pairs, which denote user_n attempted to login from IP_n, to construct a user mapping(s) and an IP mapping(s).

Upon generating the login and IP mappings, such mappings can be used to cluster related IP addresses. IP addresses are generally related to one another based on some correlation or overlap with one another (e.g., associated with a same or overlapping user identifier, etc.). By using the mappings to generate clusters of IP addresses, IP addresses associated with a botnet generally belong to a same IP address cluster.

Generally, to identify or computer clusters of IP addresses, the botnet detector 210 analyzes the login and IP maps to cluster IP addresses when a login identifier (e.g., user U) uses multiple IP addresses. As such, when a user utilizes multiple IP addresses to login to a source, the utilized IP addresses are aggregated into a cluster of IP addresses. Alternatively or additionally, IP addresses can be clustered when an overlapping IP address is shared between IP clusters. An overlapping IP address generally refers to an IP address that is included within multiple (two or more) IP clusters. For example, assume IP address 3 is in a first IP cluster with IP address 1 and a second IP cluster with IP address 2. In such a case, the first and second IP clusters can be aggregated together to form a third IP cluster that includes each of the IP addresses in the first and second IP clusters.

As such, the botnet detector 210 determines IP addresses that belong to a same IP cluster. In this regard, IP addresses, such as IP address X and IP address Y, may be determined to belong to a same cluster:
  if and only if there is a user U that used both IP Address X and IP Address Y to login
  OR
  there is an IP Address Z such that IP Address X and IP Address Z are in the same cluster and IP Address Y and IP Address Z are in the same cluster.

In operation, in one embodiment, the botnet detector 210 may traverse (e.g., alternately traverse) between the login map and IP map to generate clusters. In this regard, a particular mapping component or association within a login map or IP map (e.g., an association of a user to corresponding IP addresses or an association of an IP address to corresponding users) may be initially accessed to initiate a first cluster(s). Based on those initial associations, related associations in the other map may be accessed to add to the first cluster(s) or generate new clusters. For example, assume a user map is initially accessed. In such a case, a first association of user A to IP addresses may be accessed. Assume user A attempts logins using IP address 1 and IP address 2. In such a case, a cluster can be formed including IP address 1 and IP address 2. The portions of the IP mappings associated with IP address 1 and IP address 2 can then be accessed to determine if there are additional users that have logged in using IP address 1 or IP address 2. To the extent an additional user(s) has logged in using IP address 1 or IP address 2, the portions of the user mapping associated with the additional users of IP addresses 1 and/or 2 can then be accessed to identify any further IP addresses utilized by the additional user(s). This traversing between mappings can continue until no further IP addresses can be added to an IP cluster. In such a case, the next user in the user mapping not already analyzed can be accessed and analyzed in a similar manner (e.g., via traversing between user and IP mappings). Although this example started by accessing the user mapping, as can be appreciated, the IP mapping may be initially accessed to begin the traversing between mappings.

In another embodiment, IP clusters may initially be generated by traversing through all associations in one of the maps. For example, initially, a user mapping may initially be accessed and IP clusters may be formed in association with each individual user to cluster the IP addresses used by the corresponding user to login in. After generating the initial clusters of IP addresses, clusters having overlapping IP addresses (a same IP address included in multiple clusters) can be combined. For instance, assume a first user uses five IP addresses to login to a source. Those five IP addresses are determined to be in a first cluster. Further assume that a second user uses six IP addresses to login to the source. Those six IP addresses can be determined to be in a second cluster. Now assume that it is determined that an IP address overlaps in the first and second cluster. In such a case, the two clusters can be combined resulting in ten IP addresses associated with the new, or combined, cluster.

Accordingly, the generated IP clusters can include various IP addresses associated with common users utilizing those IP addresses to login to a source. Such a structure generally aligns with an assumption that an attacker would utilize a common pool of login credentials in an effort to trick the IP counters recognizing an attack. As can be appreciated, any number of clusters may be generated, and the clusters may be of various sizes.

Figure 3:
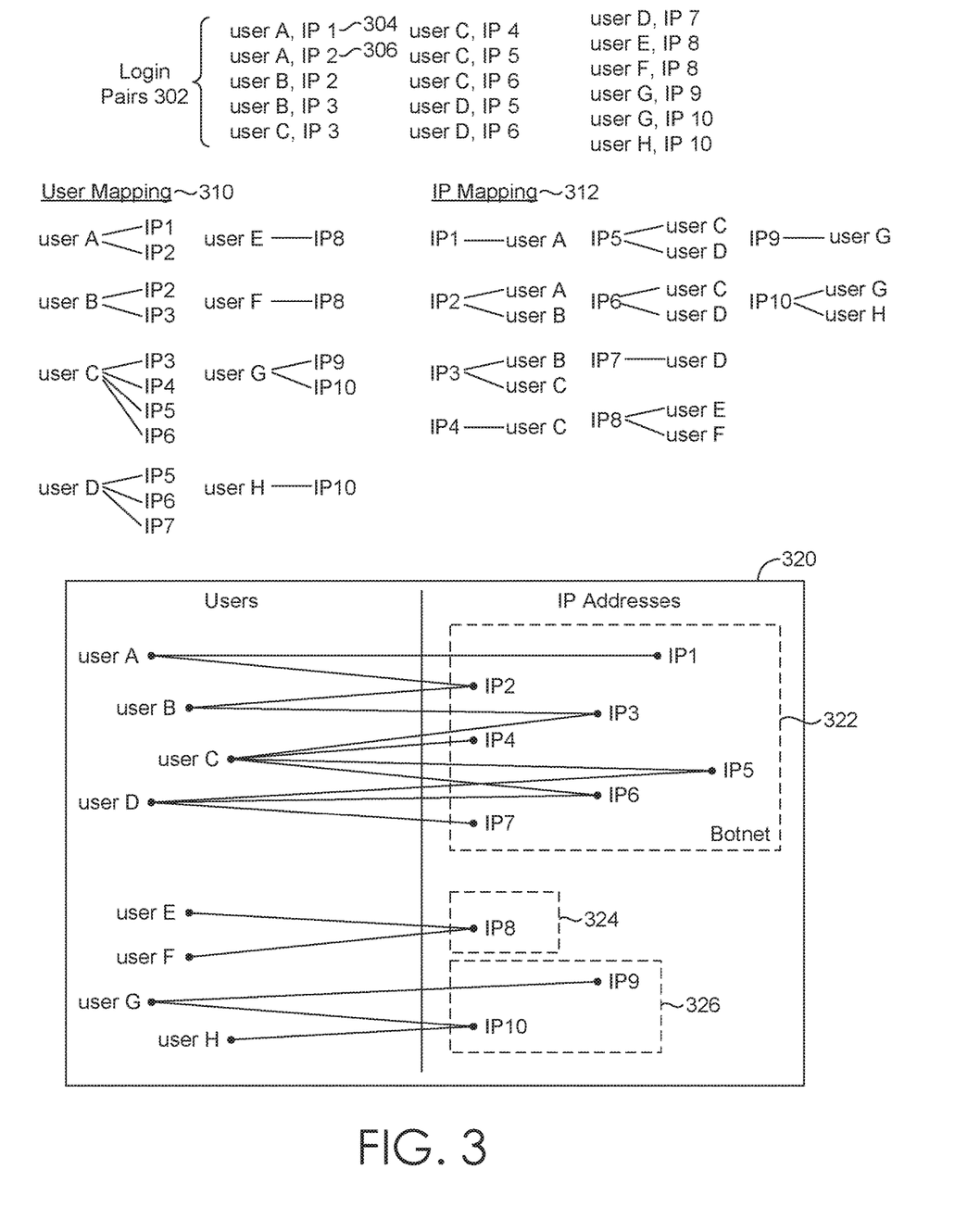
FIG. 3 illustrates one example illustrating IP clustering via user and IP mappings, in accordance with embodiments of the present invention.

By way of example, and with reference to FIG. 3, assume a set of login pairs 302 is obtained via the botnet detector 210. As shown, each login pair includes a user identifier and IP address pair. The IP address is an IP address the user utilized in an attempt to login to a source. For example, user A attempted to login to a source using IP address 1 and IP address 2, as indicated by login pair 304 and login pair 306. In accordance with obtaining the login pairs 302, a user mapping 310 and an IP mapping 312 can be generated. As shown, in the user mapping 310, user A maps to IP address 1 and IP address 2, user B maps to IP address 2 and IP address 3, and so on. In the IP address mapping 312, IP address 1 maps to user A, IP address 2 maps to user A and user B, and so on. The user mapping 310 and IP mapping 312 can be traversed back and forth to generate a clusters of IP addresses. As previously described, each IP address cluster may have IP addresses deemed related based on an overlap of use by a user or an overlapping IP address(es) between smaller clusters.

Mapping representation 320 illustrates a representation of the user mapping 310 and IP mapping 312. As shown, for example, user A maps to IP address 1 and IP address 2; user B maps to IP address 2 and IP address 3; user C maps to IP address 3, IP address 4, IP address 5, and IP address 6; and so forth. As shown in this representation, each of the IP addresses 1-7 are clustered into a single cluster 322 based on a user(s) using multiple IP addresses in login attempts or an IP address(es) that overlaps between users. Further, as illustrated, IP address 8 comprises its own cluster 324, and IP addresses 9 and 10 are clustered into a single cluster 326. In this example, assume a botnet threshold IP address number is six. In such a case, because single IP cluster 322 includes seven IP addresses, such IP addresses can be designated as a botnet, or otherwise indicated as being suspect IP addresses.

Although generation of IP clusters is generally discussed herein, embodiments may additionally or alternatively generate user clusters. Similar implementations may be employed to generate user clusters associated with common IP addresses used for logins.

Upon generating clusters, botnet detector 210 can analyze the IP clusters to identify which of the IP clusters, if any, indicate a botnet. In some cases, a cluster of IP addresses may be identified as associated with a botnet when the cluster is larger than a configured threshold amount. For example, IP clusters having more than 300 IP addresses may be identified as a botnet. In some cases, the botnet detector 210 can output a list of identified botnets and/or corresponding IP addresses. Each botnet can be represented by the set of IP addresses included in the corresponding IP cluster.

The blacklist generator 212 is generally configured to generate or update an IP blacklist. As previously discussed, an IP blacklist refers to a list of IP addresses identified as suspicious or high risk. As such, IP addresses in a blacklist can be used to alter or prohibit subsequent use of the IP addresses to access a source. For example, in some cases, subsequent access to a source via an IP address on a blacklist may be scrutinized with higher login security.

As described, IP addresses that might be added to a blacklist include those identified as associated with a botnet, or those associated with an IP cluster having a number of IP addresses that exceeds a threshold amount. Additionally, other IP addresses detected as suspicious or suspect via alternative methods may also be included in such an IP blacklist. For example, IP addresses identified as suspicious based on an IP counter ratio may also be included in the IP blacklist.

An IP blacklist may be generated and/or updated at any time. In some cases, for example, the botnet detector 210 may access login data on a periodic basis to detect botnets. As such, the IP blacklist may be generated or updated in a similar frequency.

The risk assessment manager 206 is generally configured to assess risk associated with login attempts to a source(s). In embodiments, the risk assessment manager 206 assesses each login attempt. The risk assessment manager 206 may obtain an IP address associated with a login to a source. Upon obtaining an IP address associated with a login, the IP blacklist can be referenced to identify whether the IP address utilized for login is included in the IP blacklist. If the IP address used for login is not in the IP blacklist, the login to the source may proceed. On the other hand, if the IP address used for login is in the IP blacklist, a higher level of security may be imposed to complete the login (or login may be prevented altogether). One example of a higher level of security that may be imposed is multi-factor authentication. As such, in cases that an IP address being used for login is identified in an IP blacklist, the user may be forced to utilize a second-factor authentication. Another example of a higher level of security that may be imposed is challenge-response authentication (e.g., CAPTCHA).

In some cases, the higher level of security may be limited to instances in which a user has not marked the device as a trusted device. In this way, if a user has marked a device as a trusted device, a second factor authentication may not be forced for the user to complete login to the source.

Figure 4:
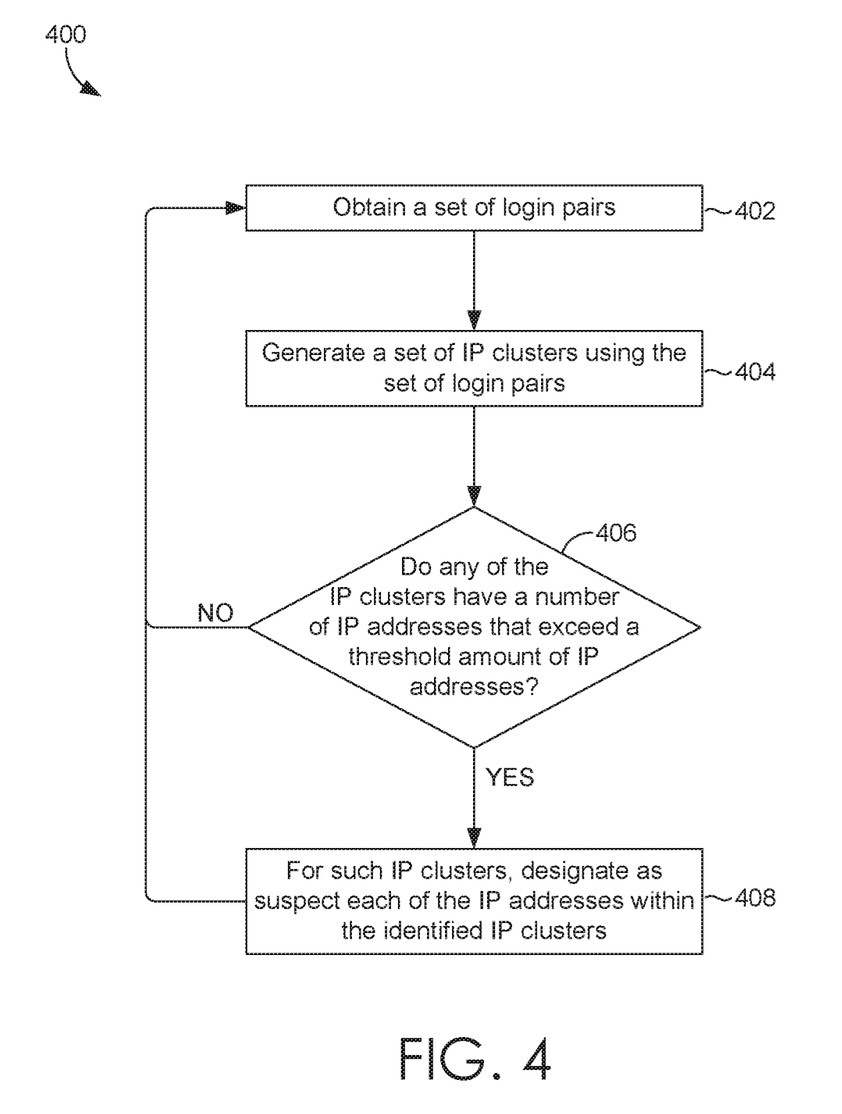
FIG. 4 is a process flow of an example for identifying suspect Internet Protocol (IP) addresses, in accordance with embodiments of the present invention.

With reference to FIG. 4, a process flow is provided showing method 400 as one example for identifying suspect Internet Protocol (IP) addresses. Such a process flow may be executed via botnet detection engine 112 of FIG. 1 or botnet detection engine 202 of FIG. 2. Initially, as indicated at block 402, a set of login pairs are obtained. Login pairs may include sets of login identifiers (e.g., user identifiers) and corresponding IP addresses used in attempts to login to a source. Login pairs may be obtained or identified via log data captured in association with source logins. At block 404, a set of IP clusters is generated using the set of login pairs. In embodiments, each IP cluster includes one or more IP addresses identified as related based on a user identifier being used to attempt to login to the source via multiple IP addresses or based on an IP address being used to attempt to login to the source via multiple user identifiers. Subsequently, at block 406, it is determined whether any of the IP clusters have a number of IP addresses that exceeds a threshold amount of IP addresses. If so, for the IP clusters having a number of IP addresses that exceeds the threshold amount of IP addresses, each of the IP addresses within the identified IP clusters are designated as suspect IP addresses, as indicated at block 408. In such cases, each of the suspect IP addresses can be added to an IP blacklist to facilitate enhanced security, when needed, for subsequent login attempts. On the other hand, if none of the IP clusters have a number of IP addresses that exceeds the threshold amount of IP addresses, the method returns to block 402 to obtain login pairs.

Figure 5:
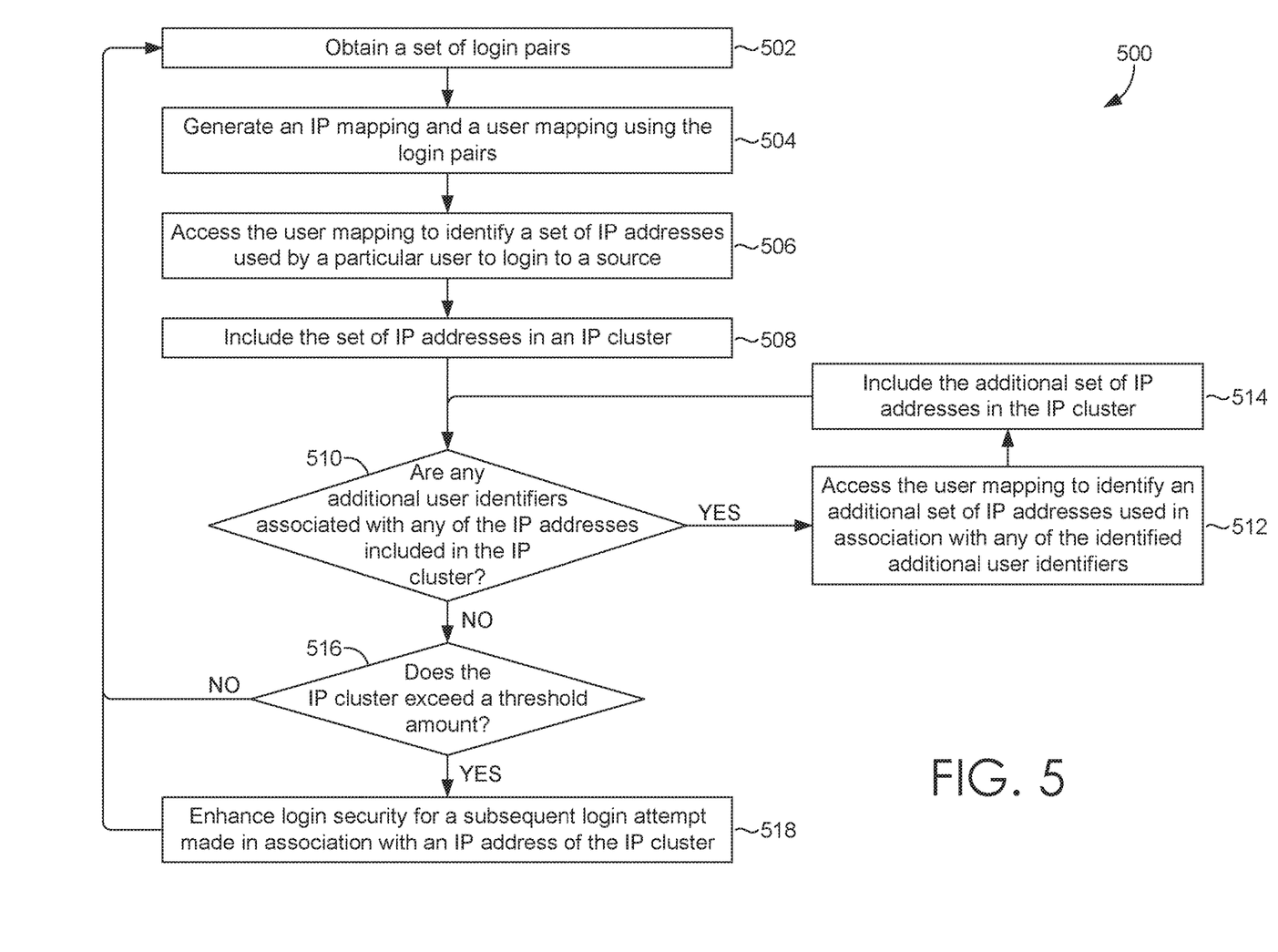
FIG. 5 is a process flow of another example for identifying suspect Internet Protocol (IP) addresses, in accordance with embodiments of the present invention.

Turning to FIG. 5, a process flow is provided showing method 500 as another example for identifying suspect Internet Protocol (IP) addresses. Such a process flow may be executed via botnet detection engine 112 of FIG. 1 or botnet detection engine 202 of FIG. 2. Initially, a set of login pairs is obtained, as shown at block 502. Each login pair includes a user identifier and a corresponding IP address used in an attempt to login to a source. At block 504, the login pairs are used to generate an IP mapping and a user mapping. In embodiments, the IP mapping can associate each IP address to corresponding user identifiers used for source login attempts, and the user mapping can associate each user identifier to corresponding IP addresses used for source login attempts. At block 506, the user mapping is accessed to identify a set of IP addresses used by a particular user to login to a source. At block 508, the set of IP addresses are included in an IP cluster. At block 510, the IP mapping is accessed to identify if any additional user identifiers are associated with any of the IP addresses included in the IP cluster. If so, at block 512, the user mapping is accessed to identify an additional set of IP addresses used in association with any of the identified user identifiers. At block 514, the additional set of IP addresses are included in the IP cluster. This process returns to block 510 to continue generating the IP cluster until there are no additional related IP addresses. At block 516, a determination is made as to whether IP cluster exceeds a threshold amount of IP addresses. If so, at block 518, login security is enhanced for a subsequent login attempt made in association with an IP address of the IP cluster. If not, the process returns to block 502 to obtain login pairs for subsequent generation of IP clusters.

Figure 6:
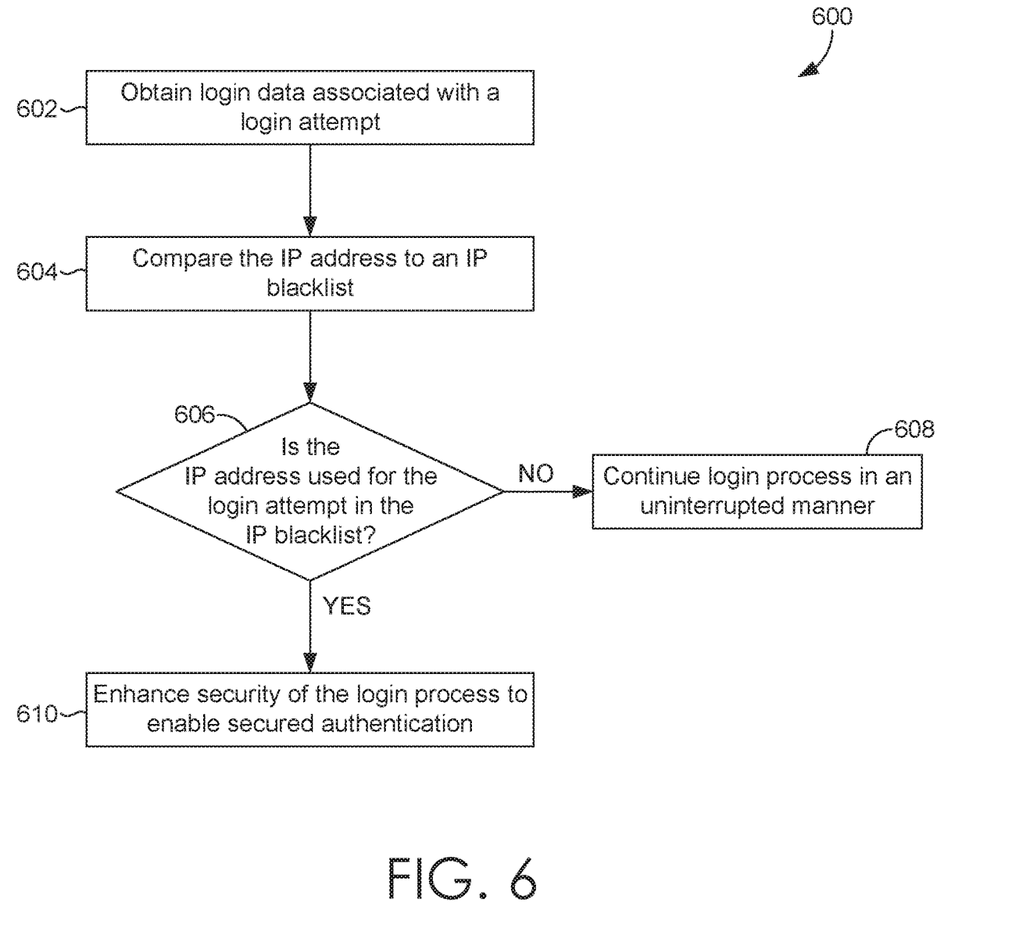
FIG. 6 is a process flow for securing logins in accordance with a detected botnet, in accordance with embodiments of the present invention.

With reference now to FIG. 6, a process flow is provided showing method 600 as an example for securing logins in accordance with a detected botnet, in accordance with embodiments described herein. Such a process may be executed in accordance with the risk assessment manager 206, for example. Initially, at block 602, login data associated with a login attempt is obtained. For example, a user identifier and/or corresponding IP address used to perform the login attempt may be obtained. At block 604, the IP address is compared to an IP blacklist. At block 606, a determination is made as to whether the IP address used for the login attempt is in the IP blacklist. If not, the login process continues in an uninterrupted manner, as shown at block 608. If, however, it is determined that the IP address used for the login attempt is in the IP blacklist, at block 610, the security of the login process is enhanced to enable further secured authentication. For example, a multi-factor authentication or challenge-response authentication may be initiated to secure continuation of the login.

Figure 7:
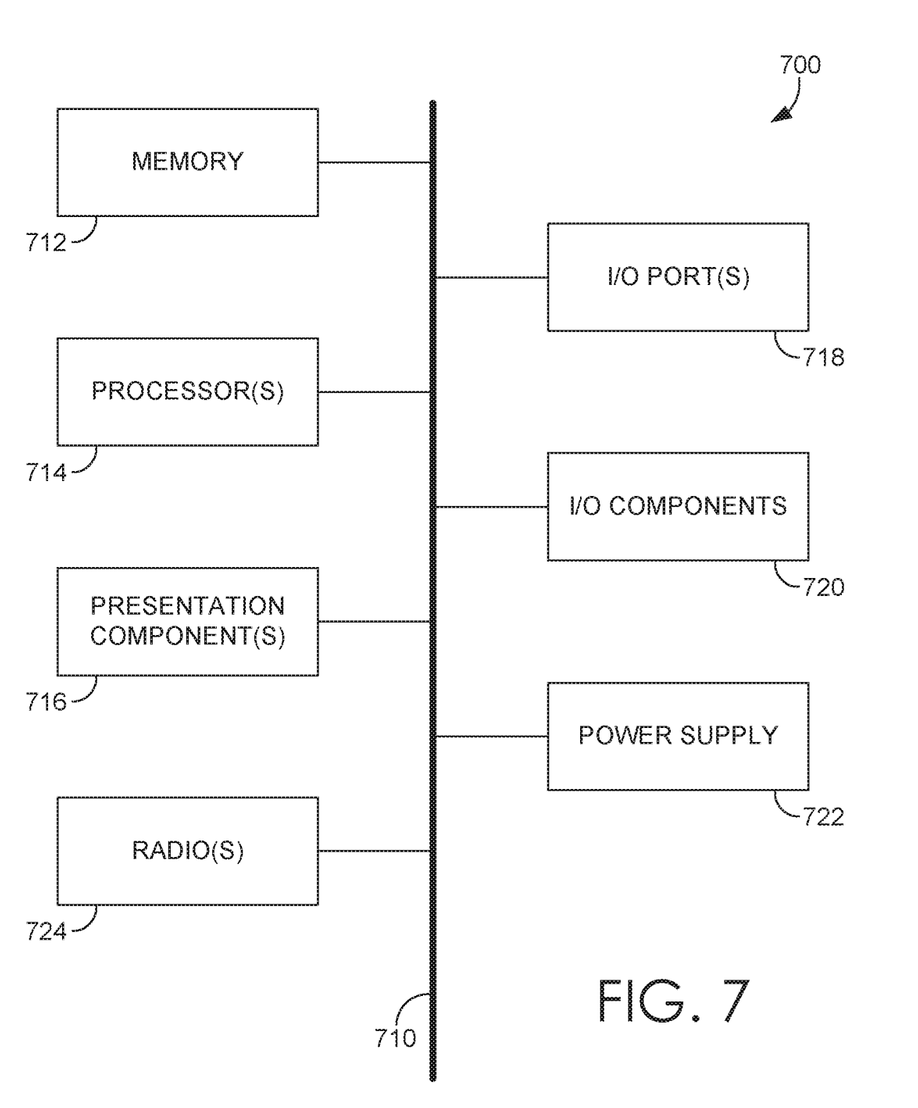
FIG. 7 is a block diagram of an example computing device in which embodiments of the present disclosure may be employed.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for identifying suspect Internet Protocol (IP) addresses, the method comprising:
    obtaining a set of login pairs comprising user identifiers and IP addresses used in attempts to login to a source;
    generating a first mapping from the set of login pairs comprising a first plurality of mapping components, wherein each mapping component of the first plurality of mapping components comprises one user identifier and one or more IP addresses corresponding to the user identifier;
    generating a second mapping from the set of login pairs comprising a second plurality of mapping components, wherein each mapping component of the second plurality of mapping components comprises one IP address and one or more user identifiers corresponding to the IP address;
    generating a set of IP clusters using the set of login pairs by correlating one or more mapping components of the first mapping to one or more mapping components of the second mapping, wherein each IP cluster includes one or more IP addresses identified as related based on a user identifier being used to attempt to login to the source via multiple IP addresses or an IP address being used to attempt to login to the source via multiple user identifiers;
    determining that a particular IP cluster exceeds a threshold amount of IP addresses; and
    designating each of the IP addresses within the particular IP cluster as a suspect IP address based on the particular IP cluster exceeding the threshold amount of IP addresses.

2. The computer-implemented method of claim 1, wherein the source comprises a website or an application.

3. The computer-implemented method of claim 1, wherein the set of IP clusters is generated by:
    alternately traversing between the first mapping and the second mapping to correlate the one or more mapping components of the first mapping to the one or more mapping components of the second mapping.

4. The computer-implemented method of claim 1, wherein the threshold amount of IP addresses is predetermined as a number of IP addresses that indicates a botnet.

5. The computer-implemented method of claim 1 further adding each of the IP addresses within the particular IP cluster to an IP blacklist.

6. The computer-implemented method of claim 5, wherein the IP blacklist is used to provide secure logins to the source.

7. The computer-implemented method of claim 1 further comprising:
    detecting a subsequent login attempt made via one of the suspect IP addresses; and
    initiating a multi-factor authentication based on the subsequent login attempt being made via the one of the suspect IP addresses.

8. The computer-implemented method of claim 1 further comprising:
    detecting a subsequent login attempt made via one of the suspect IP addresses; and
    initiating a challenge-response authentication based on the subsequent login attempt being made via the one of the suspect IP addresses.

9. One or more non-transitory computer-readable media having a plurality of executable instructions embodied thereon, which, when executed by one or more processors, cause the one or more processors to perform a method for identifying suspect Internet Protocol (IP) addresses, the method comprising:
    obtaining a set of login pairs, each login pair comprising login identifiers and IP addresses used in attempts to login to a source;
    generating a first mapping from the set of login pairs comprising a first plurality of mapping components, wherein each mapping component of the first plurality of mapping components comprises one user identifier and one or more IP addresses corresponding to the user identifier;
    generating a second mapping from the set of login pairs comprising a second plurality of mapping components, wherein each mapping component of the second plurality of mapping components comprises one IP address and one or more user identifiers corresponding to the IP address;
    generating an IP cluster by correlating one or more mapping components of the first mapping to one or more mapping components of the second mapping, to identify a plurality of related IP addresses, wherein the plurality of related IP addresses includes a first IP address and a second IP address that are related based on being used in association with a particular login identifier or based on third IP address being related to the first IP address and the second IP address;
    determining that the IP cluster exceeds a threshold amount of IP addresses; and
    enhancing login security for a subsequent login attempt made in association with an IP address of the IP cluster based on the determination that the IP cluster exceeds the threshold amount of IP addresses.

10. The one or more non-transitory computer-readable media of claim 9, wherein the first mapping and the second mapping are alternately traversed to identify the plurality of related IP addresses.

11. The one or more non-transitory computer-readable media of claim 9, wherein the third IP address is in a first IP cluster with the first IP address and is in a second IP cluster with the second IP address.

12. The one or more non-transitory computer-readable media of claim 9, wherein the third IP address is in a first IP cluster with the first IP address and is in a second IP cluster with the second IP address, and wherein the first IP cluster and the second IP cluster are aggregated to generate the IP cluster based on the third IP address being in the first IP cluster and the second IP cluster.

13. The one or more non-transitory computer-readable media of claim 9, wherein enhancing login security comprises initiating a multi-factor authentication.

14. The one or more non-transitory computer-readable media of claim 9, wherein enhancing login security comprises initiating a challenge-response authentication.

15. The one or more non-transitory computer-readable media of claim 9, the method further comprising adding the plurality of related IP addresses to an IP blacklist.

16. The one or more non-transitory computer-readable media of claim 9, the method further comprising identifying the plurality of related IP addresses as a botnet.

17. A computing system comprising:

one or more processors; and one or more non-transitory computer-readable storage media, coupled with the one or more processors, having instructions stored thereon, which, when executed by the one or more processors, cause the computing system to perform operations comprising:

generating a first mapping from a set of login pairs comprising a first plurality of mapping components, wherein each mapping component of the first plurality of mapping components comprises one user identifier and one or more IP addresses corresponding to the user identifier;

generating a second mapping from the set of login pairs comprising a second plurality of mapping components, wherein each mapping component of the second plurality of mapping components comprises one IP address and one or more user identifiers corresponding to the IP address;

detecting a botnet by clustering IP addresses related to one another by correlating one or more mapping components of the first mapping to one or more mapping components of the second mapping, wherein the correlating identifies a user identifier being used to attempt to login to a source via multiple IP addresses or an IP address being used to attempt to login to the source via multiple user identifiers; and assessing risk of login attempts based on use of the clustered IP addresses associated with the botnet.

18. The system of claim 17, the operations further comprising means for enhancing security of login attempts.

19. The system of claim 18, wherein the security of login attempts is enhanced via a multi-factor authentication or a challenge-response authentication.

20. The system of claim 17, wherein the assessing risk of login attempts comprises determining whether a particular IP address used to access the source is in an IP blacklist.

* * * * *

UNITED STATES PATENT AND TRADEMARK OFFICE
CERTIFICATE OF CORRECTION

| | | |
|---|---|---|
| PATENT NO. | : 11,652,844 B2 | |
| APPLICATION NO. | : 16/864350 | |
| DATED | : May 16, 2023 | |
| INVENTOR(S) | : Portase Nicusor-Sorin, Cristian-Aurel Opincaru and Manole Catalin-Teodor | |

It is certified that error appears in the above-identified patent and that said Letters Patent is hereby corrected as shown below:

In the Claims

Claim 5, Column 16, Line 1, delete "claim I" and insert -- claim 1 --.

Claim 7, Column 16, Line 7, delete "claim I" and insert -- claim 1 --.

Claim 8, Column 16, Line 14, delete "claim I" and insert -- claim 1 --.

Signed and Sealed this
Thirty-first Day of October, 2023

Katherine Kelly Vidal
*Director of the United States Patent and Trademark Office*